(12) United States Patent
Zipprich

(10) Patent No.: US 11,786,342 B2
(45) Date of Patent: *Oct. 17, 2023

(54) SURFACE AREA OF A CERAMIC BODY AND CERAMIC BODY

(71) Applicant: Holger Zipprich, Darmstadt (DE)

(72) Inventor: Holger Zipprich, Darmstadt (DE)

(*) Notice: Subject to any disclaimer, the term of this patent is extended or adjusted under 35 U.S.C. 154(b) by 511 days.

This patent is subject to a terminal disclaimer.

(21) Appl. No.: 16/986,772

(22) Filed: Aug. 6, 2020

(65) Prior Publication Data

US 2020/0360114 A1   Nov. 19, 2020

Related U.S. Application Data

(63) Continuation of application No. 12/374,430, filed as application No. PCT/EP2007/005681 on Jun. 27, 2007, now Pat. No. 10,736,717.

(30) Foreign Application Priority Data

Jul. 25, 2006  (EP) .............................. 102006034866

(51) Int. Cl.
*A61C 8/00*   (2006.01)

(52) U.S. Cl.
CPC .......... *A61C 8/0012* (2013.01); *A61C 8/0015* (2013.01); *A61C 8/0013* (2013.01)

(58) Field of Classification Search
CPC ... A61C 8/0012; A61C 8/0015; A61C 8/0013; A61C 2008/0046

See application file for complete search history.

(56) References Cited

U.S. PATENT DOCUMENTS

| | | | |
|---|---|---|---|
| 4,330,891 A | | 5/1982 | Branemark et al. |
| 4,492,577 A | * | 1/1985 | Farris .................. A61C 8/0036 |
| | | | 433/201.1 |

(Continued)

FOREIGN PATENT DOCUMENTS

| | | |
|---|---|---|
| DE | 202005002450 A1 | 7/2005 |
| EP | 1450722 A1 | 9/2004 |

(Continued)

OTHER PUBLICATIONS

Kohal et al., "Loaded custom-made zirconia and titanium implants show similar osseointegration: an animal experiment." Journal of Periodontology, Sep. 2004, vol. 75, No. 9, pp. 1262-1268.

(Continued)

*Primary Examiner* — Edward Moran
(74) *Attorney, Agent, or Firm* — WEITZMAN LAW OFFICES, LLC

(57) ABSTRACT

Disclosed is a dental implant with a post element that can be inserted into a jawbone with a mounting element attached to the post element, and a dental element affixed to the mounting element, with the post element designed as a ceramic body of yttrium and/or aluminum oxide stabilized zirconium oxide. The dental implant should have an even additionally improved ingrowth or integration behavior during the osseous implant healing, compared with the prior art. The surface of the dental implant is provided with at least one partial area that has nanoscopic pores or an otherwise executed nanoscopic structure that has a depletion zone with a reduced yttrium and/or aluminum oxide element, compared to the internal volume

17 Claims, 3 Drawing Sheets

(56) References Cited

U.S. PATENT DOCUMENTS

| | | | |
|---|---|---|---|
| 4,876,148 A | | 10/1989 | Virkar |
| 5,199,873 A | * | 4/1993 | Schulte ................ A61C 8/0045 433/173 |
| 5,222,983 A | | 6/1993 | Schmitz et al. |
| 5,282,746 A | * | 2/1994 | Sellers ................. A61C 8/0069 433/172 |
| 2005/0106534 A1 | | 5/2005 | Gahlert |
| 2005/0119758 A1 | | 6/2005 | Alexander et al. |
| 2005/0187638 A1 | | 8/2005 | Wilfried et al. |
| 2006/0147880 A1 | | 7/2006 | Krumsiek et al. |
| 2006/0154206 A1 | * | 7/2006 | Petersson ................ A61L 27/06 606/76 |
| 2009/0220561 A1 | | 9/2009 | Jin et al. |

FOREIGN PATENT DOCUMENTS

| | | |
|---|---|---|
| EP | 1777206 A1 | 4/2007 |
| WO | 2004096075 A1 | 11/2004 |
| WO | 2005070322 A1 | 8/2005 |

OTHER PUBLICATIONS

Sennerby et al. "Bone tissue response to surface-modified zirconia implants: a histomorphic and removal torque study in the rabbit." Clinical Implant Dentistry and related research, 2005, vol. 7, supp. 1, pp. s12-s20.

Oh et al. "Significantly accelerated osteoblast cell growth on alligned TiO2 nanotubes." Journal of Biomedical Materials Research, Apr. 2006, vol. 78A, Issue 1, pp. 97-103.

Ilavsky et al. "Phase composition and its changes during annealing of plasma-sprayed YSZ."

\* cited by examiner

SURFACE AREA OF A CERAMIC BODY AND CERAMIC BODY

CROSS REFERENCE TO RELATED APPLICATIONS

This application is a continuation of co-pending U.S. application Ser. No. 12/374,430, filed Mar. 27, 2009, also entitled "SURFACE AREA OF A CERAMIC BODY AND CERAMIC BODY," which is the national phase of PCT/EP07/05681, filed Jun. 27, 2007, both of which are hereby incorporated by reference in full. PCT/EP07/05681 itself derives priority from EP 10 2006 034 866.4, filed Jul. 25, 2006.

FIELD OF INVENTION

The invention relates to a dental implant with a post element that can be inserted into a jawbone and with a mounting element associated with same, to which mounting element a dental prosthesis element can be attached, with the post element being embodied as an yttrium- and/or aluminum oxide-stabilized zirconium oxide-based ceramic body.

BACKGROUND

Dental implants are known in a wide variety of forms. They are usually used through screwing into the jawbone at the site of a tooth which has been extracted or has fallen out in order to hold a prosthetic mounting element or a crown as a dental prosthesis after a healing phase of three to four months. To this end, such a dental implant is usually embodied as an appropriately-shaped metal or ceramic body and shaped in the manner of a pin and has at its apical end a mostly self-cutting screw thread with which the pin is inserted into the appropriately-prepared implant bed.

As a rule, dental implants are manufactured from titanium, zirconium, niobium or tantalum or of histocompatible alloys which contain one of these elements as the main component. Moreover, dental implants are also manufactured from ceramics. The ceramics used are usually zirconium oxide-based ceramics in which the tetragonal phase is stabilized preferably through the admixture of yttrium oxide (TZP, TZP-A with aluminum oxide components) or which are reinforced through the (usually additional) admixture of aluminum oxide, aluminum oxide [sic] (ATZ ceramics). However, other aluminum oxide-based dental implants are also known.

The goal of all of these implants is that the osseous tissue be given the opportunity to quickly and permanently bond with the implant surface. There is also talk of so-called osseointegration here. In this context, it has already been known for some time that the microscopic structure of the implant surfaces has a special importance for the promotion of osseointegration. In particular, porous surfaces with a pore size in the micrometer range have proven advantageous up to now. As a result of the enlarged contact surface between implant and bone, bone growth is promoted and the rate of bone accretion after the post-operative trauma is therefore increased.

For example, ceramic-based dental implants of the above-named type are described in EP 1 450 722 B1, in which a roughening in the post element with a roughness depth of 4 µm to 20 µm is provided in order to promote osseointegration. There, surface structures are first produced through radiation treatment.

Moreover, metallic dental implants with a homogenous nanostructured surface are known from DE 20 2005 002 450 U1. As a result of an especially favorable wetting behavior, such nanostructured surfaces appear to promote the growing-in of the implants and the integration into the osseous tissue.

The methods known up to now for the surface structuring of ceramic bodies, particularly for use as dental implants, particularly comprise sandblasting, etching and laser treatment. The ceramic dental implants currently available on the market are usually sandblasted and generally have a roughness depth of 0.5 µm to ca. 4 µm.

Although the above-named approaches have already been able to achieve improvements in the ingrowth behavior of the dental implants, there continues to be a desire for even more extensive improvements in this regard.

SUMMARY OF THE INVENTION

It is therefore the object of the invention to propose a dental implant of the aforementioned type which has a further-improved ingrowth or integration behavior during the healing into the bone.

This object is achieved according to the invention in that the surface of the dental implant is provided at least in a partial area with a structure that has nanoscopic pores or an otherwise executed nanoscopic structure, and in that it has a depletion zone with a reduced yttrium and/or aluminum oxide element compared with the internal volume.

The invention takes the idea as a starting point that an especially extensive promotion of the osseointegration can be achieved by designing, in particular, the surface structure in the relevant area of the post element in an uncompromising manner such that it supports osseointegration. For this purpose, a surface structure on a nanoscopic scale, i.e. particularly with nanoscopic pores, which is conducive to this objective should be made available. As it surprisingly turned out during the use of yttrium-stabilized zirconium oxide for the ceramic body, the formation of such nanoscopic structures or pores near the surface can be encouraged greatly by performing a targeted reshaping of the tetragonal crystal structure (present in the internal volume of the ceramic body) of the yttrium-stabilized zirconium oxide into the monocline crystal structure. To achieve this in an especially simple manner, the targeted removal of the yttrium portion from the material is provided for near the surface, which brings about the transformation and formation of the monocline phase.

The production of the depletion zone in the surface area provided for in this manner by the invention which ends up bringing about the desired structure and the desired characteristics upon connection with the body tissue can be achieved, in particular, through the selective extraction of individual components such as, for example, chemical elements and/or oxides from the surface, preferably through an appropriately-selected etching process. Such favorable structures can be produced, in particular, by extracting from the surface individual elements and/or individual metal oxides located in the ceramic (zirconium oxide, aluminum oxide, yttrium oxide, hafnium oxide, etc.), particularly yttrium oxide and hafnium oxide. A depletion zone of these metal oxides is thus produced on and/or in the area of the surface near the boundary.

To wit, through the treatment of the ceramic base body in the manner of etching and, particularly, of intercrystalline etching, a specific nanostructure is formed on the surface. A multitude of comparatively small pores or recesses with an average extension in the sub-micrometer range, preferably smaller than 500 nm and particularly smaller than 250 nm, can be found here. Such structures can be detected, for example, by means of electron microscope imaging. The surface is characterized particularly in that the depth of the nanostructure, which is to say the depth of the pores that can be produced here, is greater than the structural width, i.e. the characteristic lateral extension of the produced structures.

The ratio in the nanostructure between the structural depth and the structural width is expediently greater than 1:1, preferably greater than 1.5:1 and particularly greater than 2:1.

The depletion zone is advantageously arranged in a portion of the post element which can be inserted into a jawbone.

Through the production of the depletion zone, the occurrence of a nanoscopic structure with the described characteristics is aided and/or made possible. Moreover, it is suspected that the oxides of the ceramics used, particularly hafnium isotopes, have radioactive characteristics. If these are detached from the surface and are not in direct contact with the bone and/or tissue cells, this can have a positive influence on bone growth and bone preservation.

Some investigations with respect to wetting characteristics have shown that there are two particular factors for the wetting characteristics of surfaces. The first factor for the wetting characteristics is the degree of hydrocarbon contamination on the surface. Wetting experiments with water and samples of titanium have shown that, immediately after etching, a hydrophilic behavior with wetting angles of less than 15° is present. After several hours of storage of the samples under exposure to air, this behavior diminishes and can end up becoming hydrophobic.

The second factor can be described as follows. Depending on the structures smaller than 100 µm, especially smaller than 10 µm and particularly smaller than 0.5 µm, it is observed that the wetting behavior can be influenced toward *hydrophilia* or hydrophobia. It turned out that in structures with this structure size and with pointed and sharp-edged elevations, the wetting characteristics change toward hydrophobic behavior. Elevations with such a structure size and rounded-off or harmonic elevations change the wetting behavior toward *hydrophilia*. Structures with the described dimensions in which the elevations have average radii that are greater than 5 nm, preferably greater than 10 nm and particularly greater than 50 nm but smaller than 500 nm, have proven to be especially favorable. Further investigations have shown that this behavior is applicable to ceramic surfaces as well.

Particularly in zirconium oxide-based ceramics, especially favorable wetting characteristics were detected when the structures are smaller than 1 µm, preferably smaller than 0.5 µm and particularly smaller than 0.2 µm, and the elevations have average radii that are greater than 5 nm, preferably greater than 10 nm and particularly greater than 50 nm but smaller than 500 nm. Depending on the structure in the structural size range between 50 nm and 50 µm, a capillary effect occurs prior to the contamination with hydrocarbons and/or through the superimposition of the described nanostructure. Said nanostructure is characterized in that water rises upward against the force of gravity on the surface, particularly on a dental implant. This characteristic proves to be especially favorable since, in this manner, proteins, particularly the BPM proteins, can be stored in and/or on the surface and/or accumulated in large quantities.

This occurs either as a result of the surface being wetted with blood or the implants being pretreated with a protein-enriched liquid.

In a ceramic surface with hydrophilic characteristics (wetting angle less than 15°) and in a nanostructure in which the ratio between the structural depth and the structural width is greater than 1:1, advantageously greater than 1.5:1 and particularly greater than 2:1, there is the possibility that the proteins will get caught in the structures and be available to promote bone growth.

The microscopic surface enlargement available for the dental implant by way of the depletion zone is characterized in that mostly round craters are formed which resemble a lunar landscape. Th[ese] craters are characterized in that the ratio between structural depth and structural width is less than 1:1, preferably less than 1:2 and particularly less than 1:5. The craters have a diameter of greater than 0.5 µm, particularly greater than 1 µm and less than 60 µm and particularly less than 40 µm. The depth of the craters is typically less than 4 µm, advantageously less than 3 µm and particularly less than 2 µm.

The good wetting characteristics of the ceramic body that can be achieved with the invention are also especially well-suited to especially advantageous use in dental or other bone implants and other applications as well. For example, these characteristics also prove to be especially important in the attachment of ceramic bodies by means of an adhesive, lacquer, cement, etc., and are therefore especially advantageous when used in conjunction with adhesive compounds of any kind. As a result, ceramic prosthetic elements (crowns, bridges, inlays, onlays) were able to be joined with a better bond to the attaching adhesive/cement than previously.

If an adhesive or other liquid fastening material wets the entire surface as a result of good wetting characteristics, a liquid transition occurs between the ceramic workpiece and the fastening material (preferably an adhesive). In this manner, optimized retention characteristics occur and an optimized bond is created between workpiece and fastening material. These characteristics can be preferably used in all areas in which zirconium oxide- or aluminum oxide-based ceramic workpieces are used.

By virtue of the favorable wetting characteristics of the surface, the flow characteristics in liquids and gases of ceramic workpieces with such a surface are also influenced.

Moreover, with regard to the phase characteristics, analysis has shown that the ratio between the tetragonal and the monocline phase changed as a result of one of the above-described treatments on the surface. After the sintering process and prior to insertion into the patient's mouth, the proportion of the monocline phase in the surface was able to be increased or reduced by means of such a process to or by at least 0.1%, preferably to or by more than 0.5% and particularly to or by more than 1.5%. Since the surface is placed under pressure through the lower density of the monocline phase, the initial formation of cracks is inhibited in this manner and an increase in the initial strength can be expected.

Particularly, the production of the provided depletion zone in the surface of the ceramic body can occur by means of an etching process in an appropriately-selected acid bath. The provided reaction partners for the ceramic of the base body, which is to say the ions with components from the VII$^{th}$ main group of the periodic system of elements, are able to act here particularly as halogens for the respective metals. In particular, the acid bath can comprise ions which consist of the elements fluorine (F) or chlorine (Cl) or include these as components. During treatment in the acid bath, the possibility is brought about for the ions of the acid to chemically change the surface and remain on the surface as contaminants.

Some of the abovementioned ions are also required for cell growth. Consequently, these contaminants can be produced intentionally and be detectable on the surface in the range of greater than 0.1%, preferably greater than 1% and particularly greater than 3%, and have a positive influence on bone growth.

The very nanostructures occurring in this process appear to generally promote the wetting behavior of the ceramic body or, when used as a dental implant, to promote the protein accretion and collagen and cell bonding. Chemical characteristics of the surface in the micrometer range and in the nanometer range also play a substantial role here (e.g. hydrophilic or hydrophobic, doped or pure, etc.). In the present case, an advantage of the ceramic or implant surfaces produced or prepared using the method according to the invention which is especially important for oral implantology appears to consist particularly in the fact that they have a markedly hydrophilic nature which is not lost even after long-term contact of the implant body with the Earth's atmosphere, for example.

The contact angle which a drop of liquid wetting the surface forms with the surface can be used as a measure of hydrophilic character. As has been shown, the ceramic surfaces treated according to the novel method lead to a decidedly good wettability with contact angles of less than 10°, particularly with water. This means that drops of liquid on the surface have the shape of a very flat spherical cap. In addition, the thus-expressed hydrophilic nature of the produced metal bodies remains durably intact even over a time period of more than a few days.

The dental implant, and its ceramic body in particular, is preferably manufactured using a specifically selected method. For this purpose, an implant base body is preferably used as the ceramic base body which is provided with a microstructured, preferably sandblasted, laser-treated and/or etched surface. The implant surface of the dental implant manufactured in this manner has a multitude of irregularly arranged but statistically approximately homogeneously distributed pores with a roughness depth of ca. 0.5 µm to 20 µm on the one hand, but craters with a diameter of 0.5 µm to ca. 60 µm are produced on the other hand which have a roughness depth of less than 4 µm and particularly less than 2 µm and additionally have the described nanoscopic structure. Dental implants designed in this manner strongly support and accelerate the healing process occurring after the implantation through stimulation of the activity of the bone-forming cells, the osteoblasts. Even so, the manufacturing process for the implant is comparatively simple and cost-effective to carry out and control, even on an industrial scale. The process parameters are preferably selected such that a nanostructure of the above-described type forms on the surface of the implant base body superimposed on the microstructure.

The ceramic body is preferably embodied as a bone implant, especially preferably as a dental implant, preferably of a zirconium oxide-based ceramic, a zirconium oxide-containing ceramic or an aluminum oxide-containing ceramic, advantageously with a microstructured surface, with a nanostructure being superimposed on the microstructure and with nitrogen atoms and/or oxygen compounds being preferably accumulated in the area of the surface.

The advantages attained with the invention consist particularly in the fact that, by means of a chemical process that is simple and cost-effective to carry out, a ceramic body, particularly for use as a dental implant, with a nanostructure and a nano-roughness can be manufactured which has an advantageous effect on the healing process after anchoring of the implant in the jawbone and, particularly, also affects the attainable strength of the bond between bone and implant. Through the doping of foreign atoms, particularly nitrogen atoms, into the implant surface, the effect can be amplified even more. What is more, by virtue of the nano-scale surface structure of the ceramic body with regard to the hydrophilic characteristics and/or capillary effects associated therewith, liquids can be introduced especially simply and effectively into the surface. This could be used, for example, to place medications or other agents or reagents on the surface. However, other advantageous applications are also conceivable due to the good wettability, with the application of lacquers, adhesives or other surface coatings onto the ceramic body being facilitated considerably, for example.

The especially favorable hydrophilic behavior of the treated surface obtained through the obtained nanostructure or nano-roughness can be recognized, for example, through the thereby-obtained characteristic wetting angle, which is particularly less than 15°. In addition, as a result of the nanopores, nanostructures, the doping or accretion of nitrogen atoms/compounds on and/or at the surface, the thus-obtained hydrophilic behavior lasts comparatively longer than in a ceramic surface that has been chemically activated.

BRIEF DESCRIPTION OF THE DRAWINGS

Sample embodiments of the invention are explained in further detail on the basis of a drawing.

DETAILED DESCRIPTION

Figure 1:
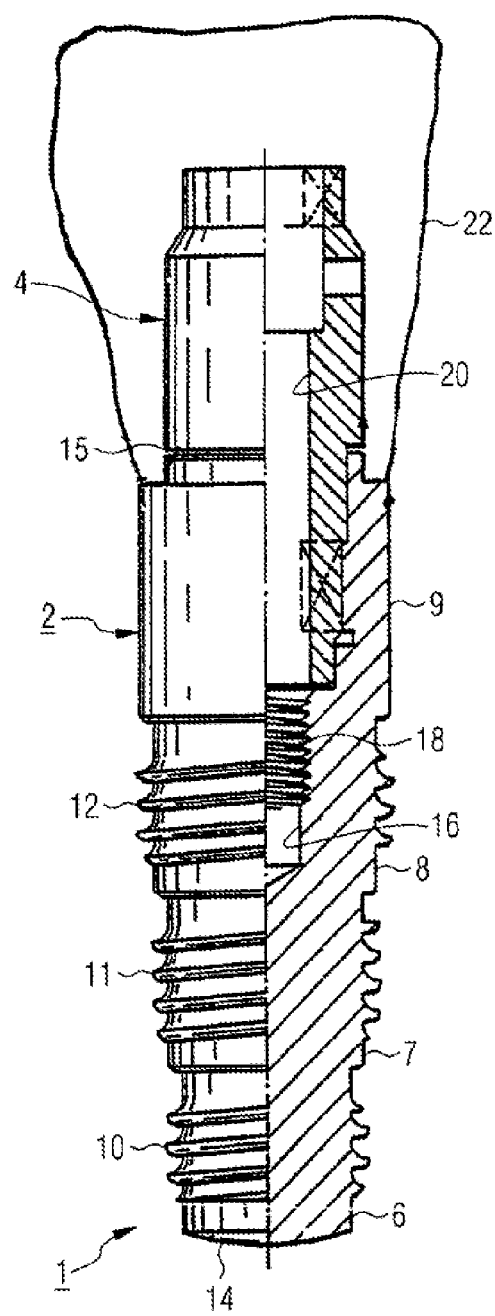
FIG. 1 shows a dental implant in partially sectional side elevation.

FIG. 1, in an elevation and partially in an axial section, shows a two-part dental implant 1 with a post element 2 and with a mounting element 4. The post element 2 and preferably also the head or mounting element 4 consist of ceramic. Here, the post element 2 is formed from yttrium-stabilized zirconium oxide and embodied as a step screw. It contains three steps 6 to 8 which respectively have a self-cutting thread 10 to 12 with equal slope. The step 6 nearest the apical end 14 possesses the smallest diameter. The step 9 nearest the mounting element 4, by contrast, has a smooth, cylindrical outer surface. The post element 2 possesses at the coronal end 15 an internal bore 16 into which the head or mounting element 4 is inserted and which further contains an internal thread 18. The connection of the mounting element 4 with the post element 2 occurs by means of a screw (not shown here) which is fed through a through hole 20 of the mounting element 4 and screwed into the internal thread 18. A crown 22 or the like can be connected in a known manner with the mounting element 4.

The post element 2 and the mounting element 4 can also be embodied as a single-piece variant.

The post element 2 is anchored in an appropriately-prepared implant bed of the jawbone. The thread construction ensures a high level of primary stability and a uniform transfer into the jawbone of the forces occurring during masticatory stress. Moreover, the bone is intended to grow as directly as possible against the implant during the healing phase following the implantation and connect closely therewith. This process, known as osseointegration, is improved considerably through a targeted roughening of the implant surface.

Figure 2:
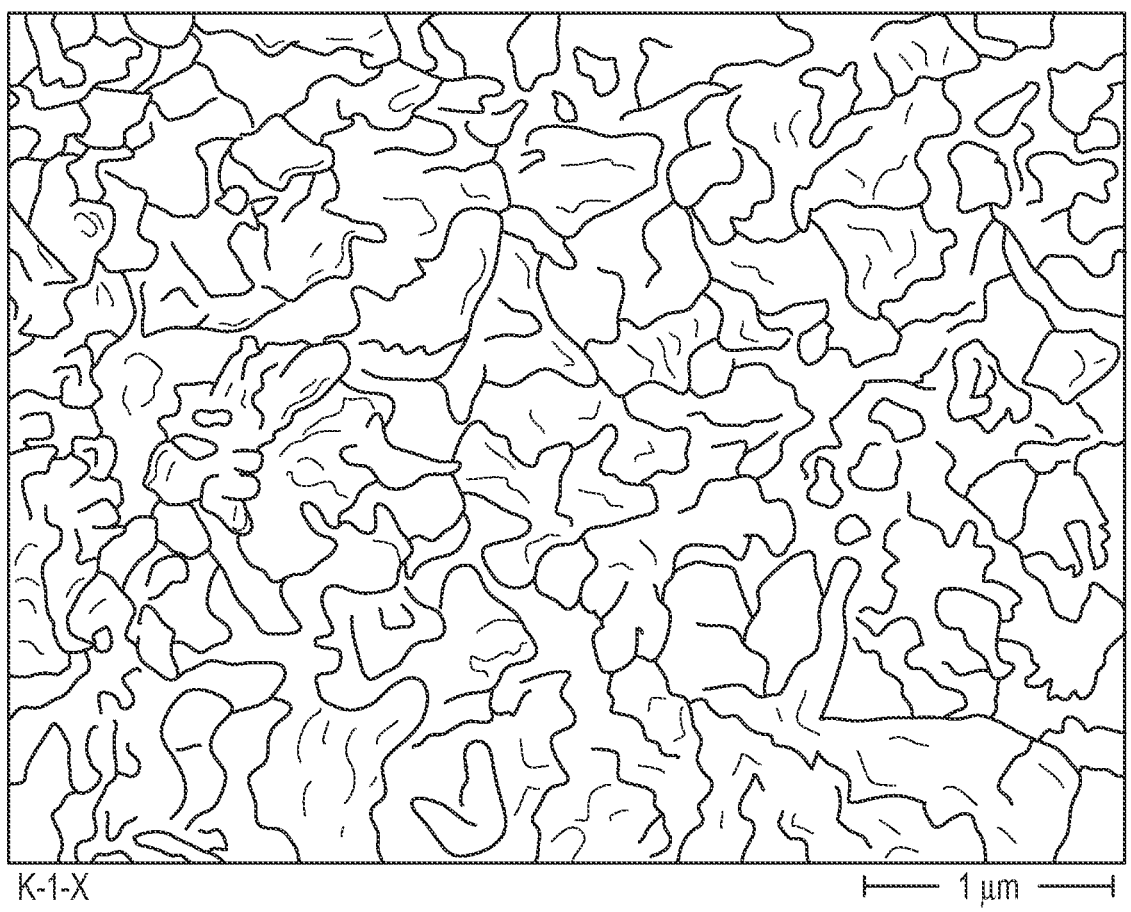
FIG. 2 shows electron-microscopic images of implant surfaces produced by means of chemical treatment with the described nanostructure.
Figure 3:
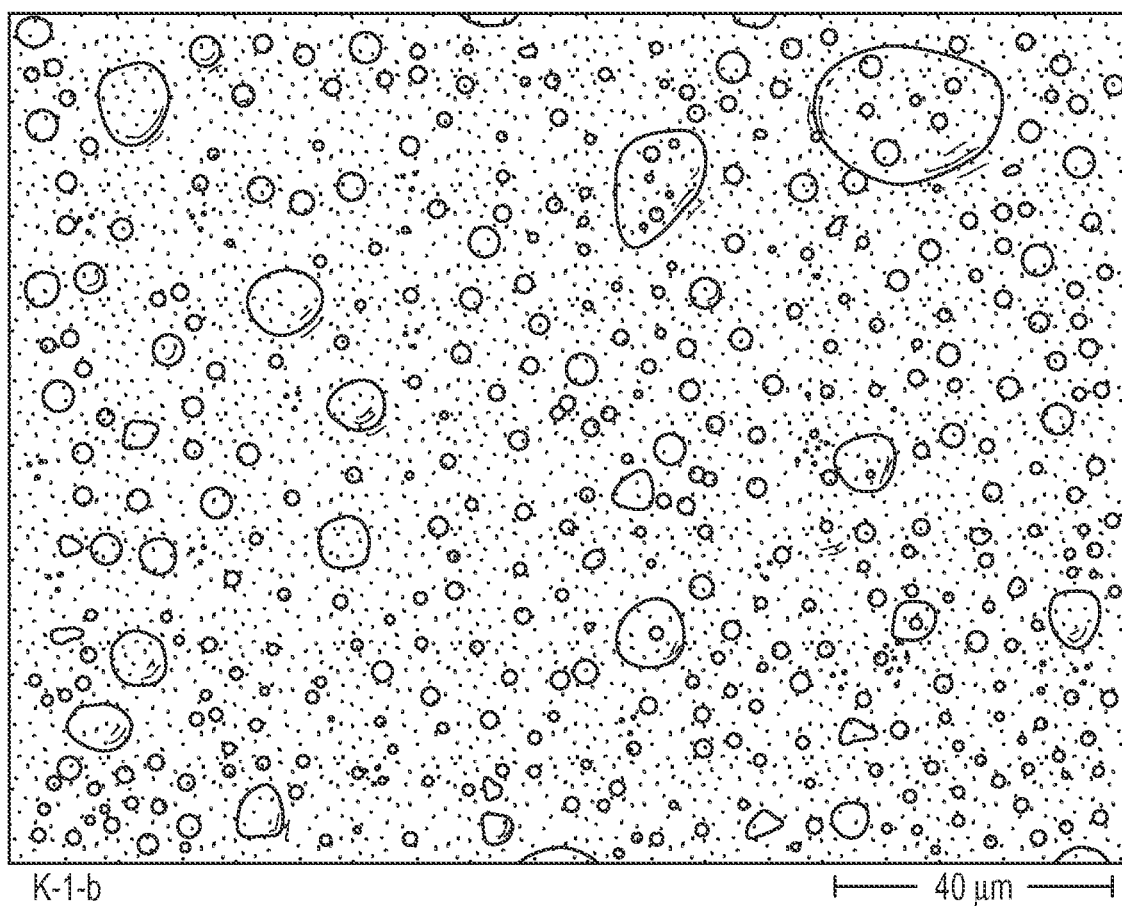
FIG. 3 shows electron-microscopic images of implant surfaces produced by means of chemical treatment with the described microstructure.

To produce this roughening, an appropriately-selected treatment is provided. Through an appropriate etching process, for example in an appropriately-selected acid bath, the depletion zone in the surface of the ceramic body is produced which is characterized by a lower proportion of selected materials in comparison to the internal volume of the ceramic body, particularly of yttrium used for the stabilization of the zirconium oxide, and consequently also by a lower proportion of the crystallographic monocline phase. This results in the very favorable surface roughnesses on a nanoscopic and microscopic scale shown in FIG. 2 and FIG. 3.

Object:
1. Zirconium oxide
    a. Yttrium-stabilized TZP, TZP-A and ATZ ceramics
Special features of the surface:
1. The content of at least one of the additives (metals/metal oxides) such as, for example, yttrium/oxide, aluminum/oxide, hafnium/oxide in the TZP zirconium ceramic is reduced at the surface by more than 5%, preferably more than 25% and particularly more than 50%.
    a. Structuring through selective and/or intercrystalline etching or corrosion through varying etching speeds.
    b. Isotopes of hafnium can be radioactive. Hafnium is technically quite difficult to separate from yttrium. This often results in a contamination of yttrium-stabilized ceramics with hafnium, which can lead to a radioactive effect, albeit a very slight one. The removal of these materials can have a favorable effect on the radioactive characteristics of the surface.
2. The proportions of the monocline phase in the surface are increased by at least 0.25%, preferably by 1% and particularly by more than 2%.
    a. Brings about a lower density in the area of the surface and hence the sealing of microcracks. The result is a greater initial strength.
3. The surface has a crater structure. These craters are predominantly rounded. The craters have a diameter of ca. 1 µm to ca. 60 µm. The roughness depth is 0.5 µm to a maximum of 3.9 µm.
4. The surface also has a structural size or porosity of less than 0.5 µm, preferably less than 0.2 µm and particularly less than 0.1 µm.
5. The structural depth is at least as large as the structural width of the structure per 4.
    a. If blood, other secretions or liquids with protein components, preferably the BMP protein, penetrates to the surface through capillary effects, this structure (4. and 5.) encourages the adhesion through mechanical retentions on the surface. The surface can therefore be used as storage for proteins or other additives.
6. The surface is "fluoridated" or enriched with fluoride ions and/or modified with fluorine.
    a. In order to grow, cells need small quantities of fluorine and/or fluorine ions. The accretion of small quantities of fluorine and/or fluorine ions encourages and/or accelerates cell growth. As a consequence, the healing time of implants can be shortened.

Methods:
1. General modification of the surface per 1-6
2. Surface treatment with a surface modification per 1-6 in liquid and/or gaseous media.
3. Medium per 2 is one of the elements of the $3^{rd}$ to the $7^{th}$ main group of the periodic system of elements.
4. Medium per 2 or 3 is hydrofluoric acid as the main component.
5. The temperature of the medium is maintained between 30° C. and 300° C., preferably between 50° C. and 130° C.
6. Duration of application longer than 1.1 min., preferably longer than 3 min. and particularly longer than 10 min
7. Flat surface removal rate of at least 0.1 µm, preferably greater than 0.5 µm and particularly greater than 2 µm.

What is claimed:

1. An osseointegrating implant, comprising:
a post having a surface formed of a stabilized ceramic, the ceramic having a base that is either zirconium oxide or aluminum oxide and a stabilizer that is either yttrium oxide or hafnium oxide, the post having a surface depletion region of a predetermined depth and an internal region beyond the predetermined depth beneath the surface, the internal region having a first molar density of the stabilizer, and the surface depletion region having a second molar density of the stabilizer, such that a ratio of the second molar density to the first molar density is less than 95%, and such that the internal region and the surface depletion region have differing crystallographic structures, and the surface further comprising physical surface features to engage with a bone and promote osseointegration.

2. The osseointegrating implant of claim 1, wherein the physical surface features comprise irregularly arranged nanoscopic pores.

3. The osseointegrating implant of claim 2, wherein the surface has a substantially rounded crater structure comprising craters of diameter between 1 µm and 60 µm and a roughness in the range of 2-6 µm, and wherein the nanoscopic pores have a depth of less than 1 µm.

4. The osseointegrating implant of claim 1, wherein the physical surface features comprise a screw thread to engage with the bone and distribute stress on the implant evenly into the bone.

5. The osseointegrating implant of claim 4, wherein the physical surface features comprise a multiple-step set of screw threads of increasing diameter in a coronal direction.

6. The osseointegrating implant of claim 1, wherein the entire post is formed of yttrium-stabilized zirconium oxide ceramic.

7. The osseointegrating implant of claim 1, wherein the internal region has a tetragonal crystal structure and the surface depletion region has a monocline structure.

8. The osseointegrating implant of claim 1, wherein the first molar density is in a range from 0.05% to 10% mol %.

9. The osseointegrating implant of claim 1, wherein the surface is enriched with fluorine.

10. The osseointegrating implant of claim 9, wherein fluorine ions represent a proportion of greater than 0.1% of the surface depletion region.

11. The osseointegrating implant of claim 1, wherein the ratio is less than or equal to 75%.

12. The osseointegrating implant of claim 11, wherein the ratio is less than or equal to 50%.

13. The osseointegrating implant of claim 1, wherein a radioactivity level of the internal region is greater than a radioactivity level of the surface depletion region.

14. The osseointegrating implant of claim 1, further comprising an additional prosthetic post that is affixed to the post, and to which a prosthesis is affixed.

15. The osseointegrating implant of claim 14, wherein the post and the prosthetic post are both formed from the stabilized ceramic.

16. The osseointegrating implant of claim 14, wherein an exterior surface of the prosthetic post and an interior surface of the post are threaded to permit the prosthetic post to screw into the post.

17. The osseointegrating implant of claim 14, wherein the prosthesis is a dental crown.

\* \* \* \* \*